US011961445B2

(12) United States Patent
Park et al.

(10) Patent No.: US 11,961,445 B2
(45) Date of Patent: Apr. 16, 2024

(54) MURA COMPENSATION DEVICE AND DATA PROCESSING CIRCUIT FOR MURA COMPENSATION

(71) Applicant: LX Semicon Co., Ltd., Daejeon (KR)

(72) Inventors: Jun Young Park, Daejeon (KR); Do Yeon Kim, Daejeon (KR); Min Ji Lee, Daejeon (KR); Gang Won Lee, Daejeon (KR); Young Kyun Kim, Daejeon (KR); Ji Won Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 130 days.

(21) Appl. No.: 17/537,050

(22) Filed: Nov. 29, 2021

(65) Prior Publication Data

US 2022/0172664 A1 Jun. 2, 2022

(30) Foreign Application Priority Data

Dec. 2, 2020 (KR) ........................ 10-2020-0166598

(51) Int. Cl.
*G09G 3/20* (2006.01)
*G09G 5/10* (2006.01)

(52) U.S. Cl.
CPC ............. *G09G 3/2074* (2013.01); *G09G 5/10* (2013.01); *G09G 2320/0276* (2013.01)

(58) Field of Classification Search
CPC ................... G09G 3/2074; G09G 5/10; G09G 2320/0276; G09G 2320/0233; G09G 2320/045; G09G 3/3258; G09G 3/3233; G09G 3/3648; G09G 3/3225
See application file for complete search history.

(56) References Cited

U.S. PATENT DOCUMENTS

| | | | | |
|---|---|---|---|---|
| 10,388,254 | B2 | 8/2019 | Lee et al. | |
| 10,803,830 | B2 * | 10/2020 | Aogaki | G09G 3/2007 |
| 10,964,241 | B2 | 3/2021 | Kim et al. | |
| 2018/0144719 | A1 | 5/2018 | Lee et al. | |
| 2018/0330682 | A1 | 11/2018 | Zhang | |
| 2020/0105190 | A1 * | 4/2020 | Tang | G09G 3/3225 |
| 2020/0211429 | A1 | 7/2020 | Kim et al. | |

(Continued)

FOREIGN PATENT DOCUMENTS

| | | | | |
|---|---|---|---|---|
| CN | 110447061 A | * 11/2019 | | G09G 3/006 |
| KR | 101065406 B1 | * 9/2011 | | |

(Continued)

*Primary Examiner* — Ricardo Osorio
(74) *Attorney, Agent, or Firm* — ROTHWELL, FIGG, ERNST & MANBECK, P.C.

(57) ABSTRACT

A data processing circuit according to an embodiment may include a reception circuit configured to receive image data including grayscale values associated with pixels disposed in a display panel. The data processing circuit may include a compensation circuit configured to calculate a final compensation value by multiplying a representative compensation value of each area and a global gain, and to produce converted image data. The data processing circuit may include a memory storing a representative compensation value associated with a grayscale value of each area of the display panel, and may include a transmission circuit configured to transmit the converted image data to a data driving circuit.

19 Claims, 12 Drawing Sheets

(56) References Cited

U.S. PATENT DOCUMENTS

| | | | | |
|---|---|---|---|---|
| 2021/0201744 | A1* | 7/2021 | Park ..................... | G09G 3/2003 |
| 2021/0201745 | A1* | 7/2021 | Park ..................... | G09G 3/2003 |

FOREIGN PATENT DOCUMENTS

| | | | | | |
|---|---|---|---|---|---|
| KR | 10-2018-0058266 | A | | 6/2018 | |
| KR | 10-2019-0027266 | A | | 3/2019 | |
| KR | 10-2020-0042349 | A | | 4/2020 | |
| KR | 10-2020-0079920 | A | | 7/2020 | |
| TW | I679890 | B | * | 12/2019 | |
| WO | WO-2019037170 | A1 | * | 2/2019 | ............. G09G 3/006 |

* cited by examiner

MURA COMPENSATION DEVICE AND DATA PROCESSING CIRCUIT FOR MURA COMPENSATION

CROSS REFERENCE TO RELATED APPLICATION

This application claims priority from Korean Patent Application No. 10-2020-0166598, filed on Dec. 2, 2020, which is hereby incorporated by reference for all purposes as if fully set forth herein.

BACKGROUND

1. Field of Technology

The present disclosure relates to a Mura compensation method of a Mura compensation device and a data processing circuit, and relates to a Mura compensation device and a data processing circuit which detect Mura that occurs in a display panel, and perform compensation.

2. Description of the Prior Art

Various types of panels, such as a liquid crystal display (LCD) panel, an organic light-emitting diode (OLED) panel, and the like may be used for a display device, and a panel may be controlled by a data processing circuit of the display device.

A plurality of pixels is disposed in the panel, and the data processing circuit may control a light emitting element of each pixel, for example, an organic light emitting diode (OLED), or may control an open element, for example, a liquid crystal (LC), so as to control the brightness of each pixel.

A driving device of the display panel may control the brightness of an image displayed in a panel according a method of changing a data voltage to be supplied to each pixel based on a grayscale value in order to control the brightness of each pixel.

Although the same data voltage is provided to each pixel, a difference in brightness may occur among the pixels of the panel due to various internal and external factors such as the malfunctions and defects in the process of manufacturing a display panel, design flaws, changes in physical characteristics that occur while the panel operates, and the like.

If a difference in brightness which occurs since the characteristic of some pixels in the display panel is changed from that of neighboring pixels is defined as a Mura fault, and a pixel or an area of the panel where the Mura fault occurs may be detected and compensation may be performed.

In order to detect Mura of the display panel, the pixels of the display panel are operated based on the same grayscale, the image thereof is captured, and an image that includes a pattern such as a stain or that is not displayed in the same color may be detected as Mura.

There is a desire for technology that performs compensation after identifying the brightness, color, or the like of an image displayed in the entire panel and identifying whether Mura fault occurs, so as to evenly maintain the characteristic of a screen.

However, to store the characteristic of the pixels of the entire panel in a memory in order to perform compensation on Mura occurring in the display panel, or to calculate a Mura compensation value via a complex operation in order to determine the characteristic of Mura, a memory capacity required may be excessively high, which is a drawback.

SUMMARY OF THE INVENTION

In this background, an aspect of embodiments of the present disclosure is to provide a Mura compensation device and a data processing circuit which are capable of efficiently using a memory by determining Mura for each block based on image data, and using a representative compensation value for each block.

Another aspect of the embodiments of the present disclosure is to provide a Mura compensation device and a data processing circuit which are capable of efficiently using a memory by calculating a single global gain and calculating a final compensation value.

To this end, a first embodiment may provide a data processing circuit including: a reception circuit configured to receive image data including grayscale values associated with pixels disposed in a display panel; a memory storing a representative compensation value associated with a grayscale value of each block of the display panel; a compensation circuit configured to calculate a final compensation value by multiplying the representative compensation value of each block and a global gain, and to produce converted image data; and a transmission circuit configured to transmit the converted image data to a data driving circuit.

A second embodiment may provide a Mura compensation device including: a reception circuit configured to obtain a plurality of brightness values corresponding to a plurality of grayscale values associated with a single block of a display panel; and a calculation circuit configured to: calculate compensation values for the grayscale values so as to resolve a Mura phenomenon caused by differences between target brightness values and the brightness values; and to calculate final compensation values by producing a representative compensation value for each block.

A third embodiment may provide a Mura compensation method including: calculating brightness compensation values for a plurality of pixels in a Mura block in image data; calculating a representative compensation value for each Mura block using the brightness compensation values for the plurality of pixels; calculating a global gain for each grayscale based on a single Mura block; and producing a final Mura compensation value by multiplying the representative compensation value for each Mura block and the global gain.

As described above, according to embodiments of the present disclosure, there are provided a data processing circuit and a Mura compensation method of the data processing circuit, which can improve the accuracy of Mura compensation and can minimize a memory capacity used for Mura compensation.

DETAILED DESCRIPTION OF THE EXEMPLARY EMBODIMENTS

Figure 1:
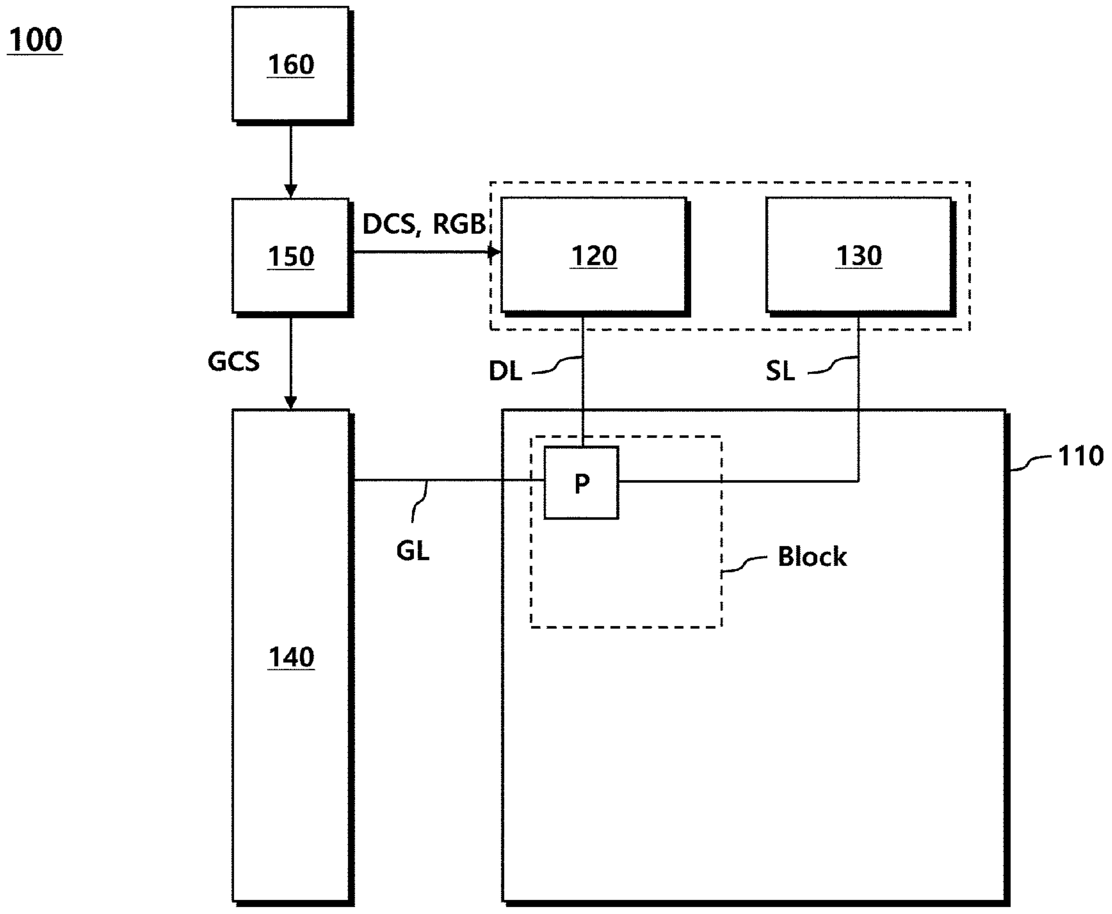
FIG. 1 is a diagram illustrating the configuration of a display device according to an embodiment.

FIG. 1 is a diagram illustrating the configuration of a display device according to an embodiment.

Referring to FIG. 1, a display device 100 may include a display panel 110, a data driving circuit 120 that drives the display panel 110, a pixel sensing circuit 130, a gate driving circuit 140, a data processing circuit 150, a host 160, and the like.

In the display panel 110, a plurality of data lines (DL), gate lines (GL), and sensing lines (SL) may be disposed, and a plurality of pixels (P) may be disposed.

The display panel 110 may be configured to be removable from a touch panel (not illustrated) or to be integrated with the touch panel, depending on the case. Various types of panels, such as, a liquid crystal display (LCD), an organic light emitting diode (OLED), and the like may be used as the display panel 110.

The data driving device 120 may supply a data voltage to a pixel (P) via a data line (DL). The data voltage supplied to the data line (DL) may be transferred to a pixel (P) connected to the data line (DL) according to a scan signal of the gate driving circuit 140. The data driving circuit 120 may be defined as a source driver, depending on the case.

The pixel sensing circuit 130 may receive an analog signal (e.g., a voltage, a current, or the like) formed in each pixel (P) via a sensing line (SL), and may determine the characteristic of the pixel (P). In addition, the pixel sensing circuit 130 may sense a change in the characteristic of each pixel (P) over time, and may transmit the same to the data processing circuit 150.

The gate driving circuit 140 may supply a scan signal of a turn-on voltage or a turn-off voltage via a gate line (GL). If a scan signal of a turn-on voltage is supplied to a pixel (P), the corresponding pixel (P) may be connected to a data line (DL). If a scan signal of a turn-off voltage is supplied to a pixel (P), the corresponding pixel (P) and a data line (DL) is disconnected. The gate driving circuit 140 may be defined as a gate driver, depending on the case.

The data processing circuit 150 may supply various control signals to the data driving circuit 120 and the gate driving circuit 140. The data processing circuit 150 may transmit a data control signal (DCS) that performs control so that the data driving circuit 120 supplies a data voltage to each pixel (P) properly at each timing, or may transmit a gate control signal (GCS) to the gate driving circuit 140. The data processing circuit 150 may be defined as a timing controller (T-Con), depending on the case.

The data processing circuit 150 may output, to the data driving circuit 120, image data (RGB) obtained by converting image data input from the outside to be appropriate for a data signal format used in the data driving circuit 120.

The data processing circuit 150 may convert image data (RGB) in units of blocks defined based on divided areas of the display panel 110. In addition, in order to perform compensation for a difference in luminance or brightness associated with a grayscale value for each block, a compensation value associated with a grayscale may be calculated and a converted image data (RGB') may be produced.

The data processing circuit 150 may store at least one compensation value for each block, and may perform compensation associated with the grayscale value of each pixel in the block. Since the at least one compensation value for each block is stored, a storage capacity for compensation values may be minimized. However, a compensation value may be stored for each pixel, depending on the case.

The data processing circuit 150 may perform compensation associated with image data (RGB) based on the characteristic of a pixel (P) determined by the pixel sensing circuit 130, may transmit the same, and may receive sensing data from the pixel sensing circuit 130.

The data processing circuit 150 may control the brightness of each pixel disposed in the display panel 150 by using the converted image data (RGB').

The data processing circuit 150 may process a signal in a digital form to adjust an output of a signal in an analog form of the data driving circuit 120. The data processing circuit 150 may calculate a brightness value or a compensation value for each block of the panel in order to resolve a Mura phenomenon. Blocks may be areas classified by position in the panel. The data processing circuit 150 may obtain a final compensation value by calculating the brightness value or the compensation value for each block in response to the change in a grayscale value.

The host 160 may produce image data and may transmit the same to the data processing circuit 150. The host may be a central processing unit (CPU), and may include various types of processing devices such as microprocessor or the like.

Figure 2:
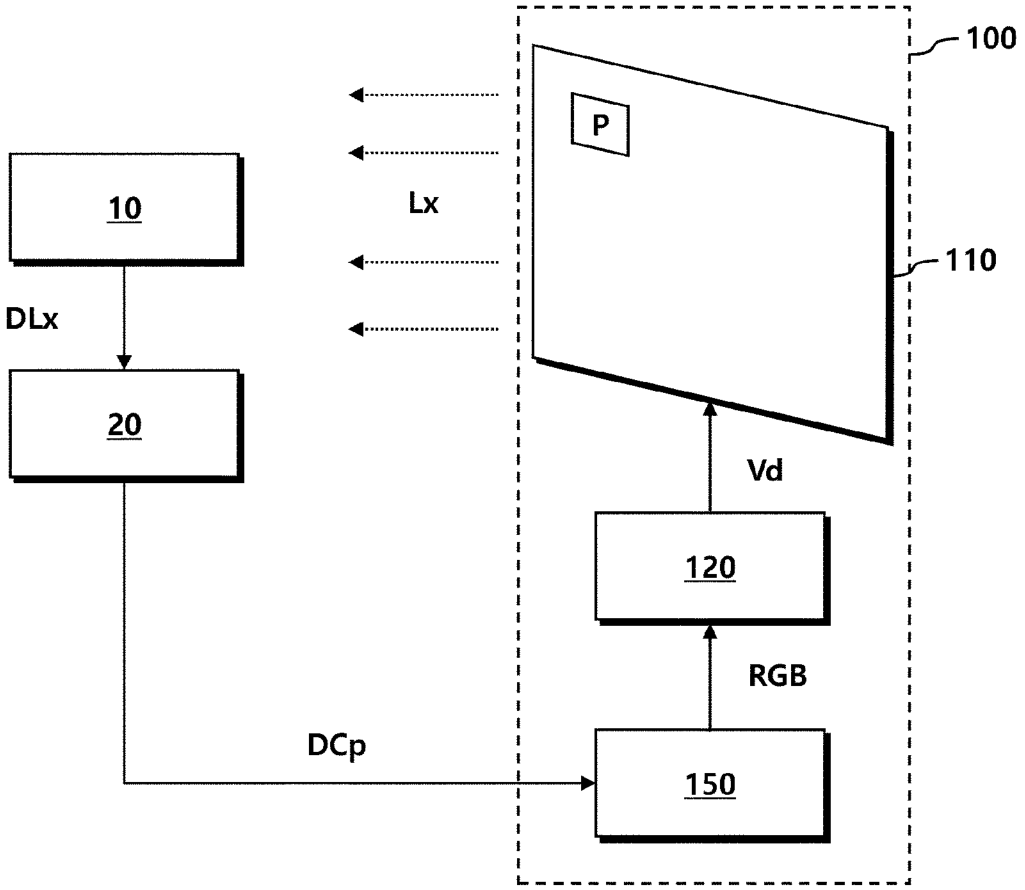
FIG. 2 is a diagram illustrating a signal flow of a Mura compensation process according to an embodiment.

FIG. 2 is a diagram illustrating a signal flow of a Mura compensation process according to an embodiment.

Referring to FIG. 2, in Mura compensation according to an embodiment, a camera device 10 may capture an image displayed in the display device 100, and a Mura compensation device 20 may calculate a compensation value (DCp) for Mura compensation and may transmit the calculated compensation value to the display device 100 so as to compensate for the Mura of the display panel 110. The Mura compensation device 20 may be included in the display device 100, depending on the case.

The data processing circuit 150 may transmit image data (RGB) having a constant grayscale value to the data driving circuit 120. The data driving circuit 120 that receives the image data (RGB) may convert the same into a data voltage (Vd) and may supply the same to the display panel 110. For example, the data voltage (Vd) may be a gamma voltage.

The display panel 110 may provide a test image for each grayscale in order to perform Mura compensation. A signal having the same grayscale value may be supplied to the display panel 110 and a reference image may be displayed. A panel inspect device (not illustrated) determine the quality of the display panel or whether the display panel normally operates based on a picture or an image obtained by capturing the reference image.

The camera device 10 may capture a test image of the display panel, and may measure and store the brightness value for each pixel or for each block. Depending on the case, the brightness value may be stored in a memory (not illustrated).

The Mura compensation device 20 may receive detection images obtained by capturing test images displayed in the display panel 110, and may determine whether Mura occurs in the display panel 110. In addition, the Mura compensation device 20 may receive a brightness value (DLx) obtained from the camera device 10, may calculate a brightness value for each block or for each pixel, and may calculate a compensation value for eliminating the Mura phenomenon. Depending on the case, the above-described process may be performed repeatedly with respect to predetermined grayscale values. For example, a Mura characteristic may be defined as a difference in color of a captured image, in addition to a difference in brightness of the captured image.

The Mura compensation device 20 may determine whether Mura occurs in the display panel 110 based on various reference values such as the brightness, the luminosity, the intensity of lightness, the color, and the like of detected images.

The Mura compensation device 20 may determine whether Mura occurs based on the image data of the entire panel. However, the storage capacity of a memory required rapidly increases. Accordingly, whether Mura occurs is determined for each block by dividing the entire panel into blocks (4×4), and the amount of the memory used may be reduced. Depending on the case, each block may include N×M pixels (N and M are natural numbers).

For example, the total number of blocks may be defined by (horizontal size)×(vertical size)×(number of sub-pixels)/(4×4-block size).

The brightness (Lx) or color of each pixel of the display panel 110 that receives a data voltage (Vd) corresponding to a grayscale value may be controlled based on the data voltage (Vd). For example, a difference in brightness (Lx) among pixels may be defined as Mura.

Grayscale values may be selected from the values in the range of 0 to 255. The brightness value (DLx) for each pixel or each block may be calculated for each of the major grayscale values, for example, 32, 64, 128, 192, and 224, and corresponding values may be stored in the Mura compensation device 20.

The Mura compensation device 20 may obtain a plurality of brightness values (DLx) corresponding to a plurality of grayscale values, and may calculate compensation values (DCp) corresponding to the plurality of grayscale values in order to remove the Mura phenomenon caused by the differences between target brightness values and the brightness values (DLx).

For example, the target brightness values may be determined mostly based on the brightness values of a block located in the center of the display panel. Depending on cases, in order to reduce the amount of calculation in association with the brightness value of a block, a representative brightness value of a block may be defined, a brightness value of a specific pixel may be defined as a target brightness value, or the target brightness values may be determined by calculating the average of the brightness values of a plurality of pixels.

The Mura compensation device 20 may transmit the calculated compensation values (DCp) to an external device so that the compensation values (DCp) are stored in the memory 157 of the data processing circuit 150.

Figure 3:
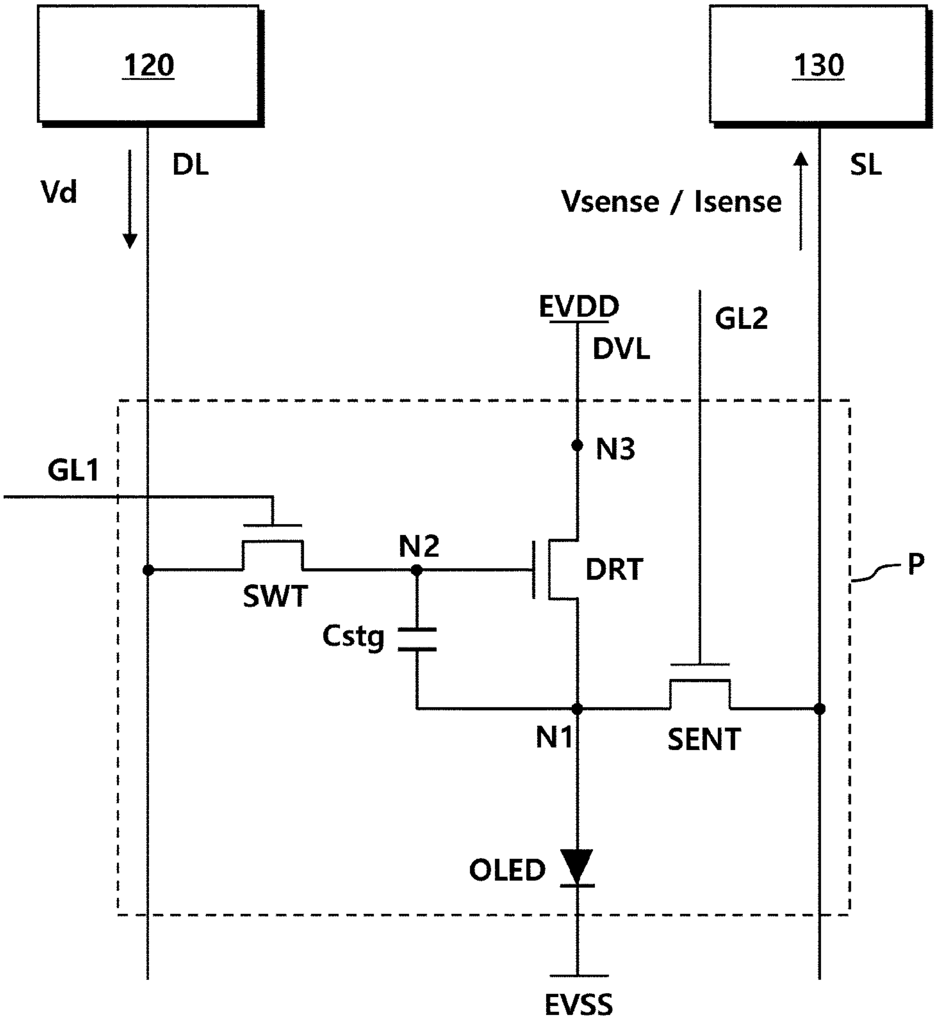
FIG. 3 is a diagram illustrating the structure of a pixel according to an embodiment.

FIG. 3 is a diagram illustrating the structure of a pixel according to an embodiment.

Referring to FIG. 3, pixels (P) disposed in the display panel 110 may include an organic light emitting diode (OLED), a driving transistor (DRT), a switching transistor (SWT), a sensing transistor (SENT), a storage capacitor (Cstg), and the like.

The data driving circuit 120 may transfer a driving voltage (Vd) to each pixel (P) via a data line (DL), and the pixel sensing circuit 130 may receive an analog signal formed in each pixel (P) and determine the characteristic of the pixel (P). The data processing circuit 150 may analyze the pixel sensing data, may recognize the characteristic of each pixel (P), and may control a driving signal.

According to control performed by the driving transistor (DRT), an anode electrode is connected to a driving voltage (EVDD) and a cathode electrode is connected to a base voltage (EVSS), and light is emitted. The driving transistor (DRT) may control a driving current supplied to an OLED and may control the brightness of the OLED.

According to an embodiment, the driving transistor (DRT) controls a driving current so as to change the brightness of the OLED, in order to compensate for a Mura characteristic.

The sensing transistor (SENT) may connect a first node (N1) of the driving transistor (DRT) and a sensing line (SL), and the sensing line (SL) may transfer a reference voltage (Vref) to the first node (N1), and may transfer an analog signal, for example, a voltage or a current, formed in the first node (N1) to the pixel sensing circuit 130.

The pixel sensing circuit 130 may measure the characteristic of a pixel (P) using an analog signal (Vsense or Isense) transferred via a sensing line (SL). The pixel sensing circuit 130 may measure a current transferred from the first node (N1) or transferred to the first node (N1), and may transmit pixel sensing data, which is a digital signal associated with the measurement value, to the data processing circuit 150.

The characteristics of an OLED and a transistor included in each pixel (P) may vary over time or depending on the ambient environment. A difference in brightness and a difference in color of the display panel 110 may occur due to a fabrication error, a change in the characteristic of a pixel (P), external factors, and the like, and the phenomenon may be defined as Mura. Mura may occur when the electrical and optical characteristics are not maintained equally in respective pixels, and a criterion to determine Mura may be differently set based on a Mura characteristic.

The technical idea of the present disclosure is not limited to the resolution of the Mura phenomenon of an OLED display panel, but may be applied to various types of display panels.

Figure 4:
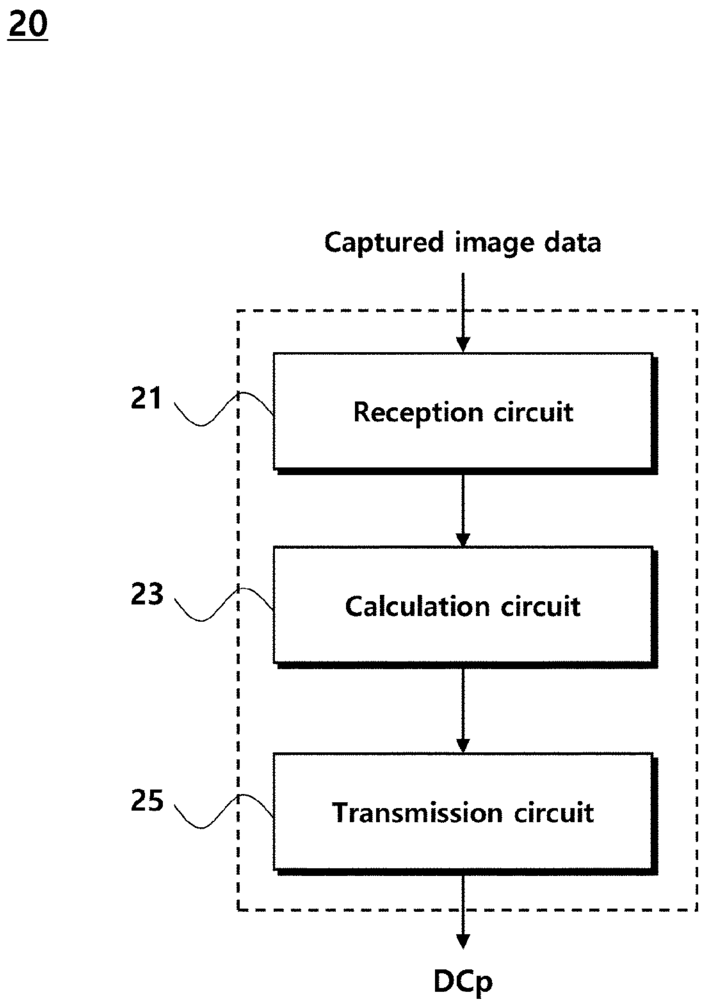
FIG. 4 is a diagram illustrating the configuration of a Mura compensation device according to an embodiment.

FIG. 4 is a diagram illustrating the configuration of a Mura compensation device according to an embodiment.

Referring to FIG. 4, a Mura compensation device 20 may include a reception circuit 21, a calculation circuit 23, a transmission circuit 25, and the like.

The reception circuit 21 may obtain a plurality of brightness values corresponding to a plurality of grayscale values for each block of the display panel 110. The reception circuit 21 may receive brightness values via communication with the camera device 10.

The reception circuit 21 may obtain the brightness values of pixels in a block in order to calculate a representative compensation value defined for each block.

The calculation circuit 23 may calculate compensation values (DCp) for grayscale values so as to settle the Mura phenomenon caused by the difference between target brightness values and measured brightness values.

The calculation circuit 23 may calculate compensation values for the grayscale values so as to settle the Mura phenomenon caused by the difference between target brightness values and the brightness values, and may produce a representative compensation value for each block. Here, a block may have a representative compensation value corresponding to a grayscale value or a plurality of representative compensation values corresponding to different grayscale values. The technical idea of the present disclosure is to use representative compensation values without using compensation values for all the grayscale values in order to reduce the memory capacity requirement and is not limited to the aforementioned examples.

The calculation circuit 23 may select one of a plurality of blocks of the display panel, and may produce a global gain based on a plurality of brightness values corresponding to a plurality of grayscale values.

The calculation circuit 23 may obtain final compensation values by multiplying the representative compensation value for each block and the global gain. Depending on the case, the operation process may be performed by the data processing device 150.

The calculation circuit 23 may produce an interpolation function based on a plurality of brightness values corresponding to a plurality of grayscale values. The interpolation function may be a quadratic function or a higher-order function. However, calculation is complex and memory usage is increased and thus, the interpolation function may be configured to be a linear function. The use of the interpolation function allows reducing the number of compensation values for each grayscale actually obtained. In addition, a spectrum of compensation values for various grayscale may be obtained as necessary.

The calculation circuit 23 may calculate a compensation value that converts a grayscale value at which a brightness value has been measured, into a grayscale value for compensation. For example, a data processing circuit may produce the grayscale value for compensation by applying the grayscale value to a linear function, and a gain value and an offset value applied to the linear function may be calculated as compensation values.

The compensation values (DCp) may be finally inserted into the memory 157 of the data processing circuit 150 for driving the display panel. To this end, the transmission circuit 25 may transmit these compensation values to a device that stores the compensation values in the memory 157 of the data processing circuit 150.

Depending on the case, the Mura compensation device 20 may be disposed inside the display device 100 or the Mura compensation device 20 may be disposed separately from the display device 100 and may be configured as a separate device together with the camera device 10.

Figure 5:
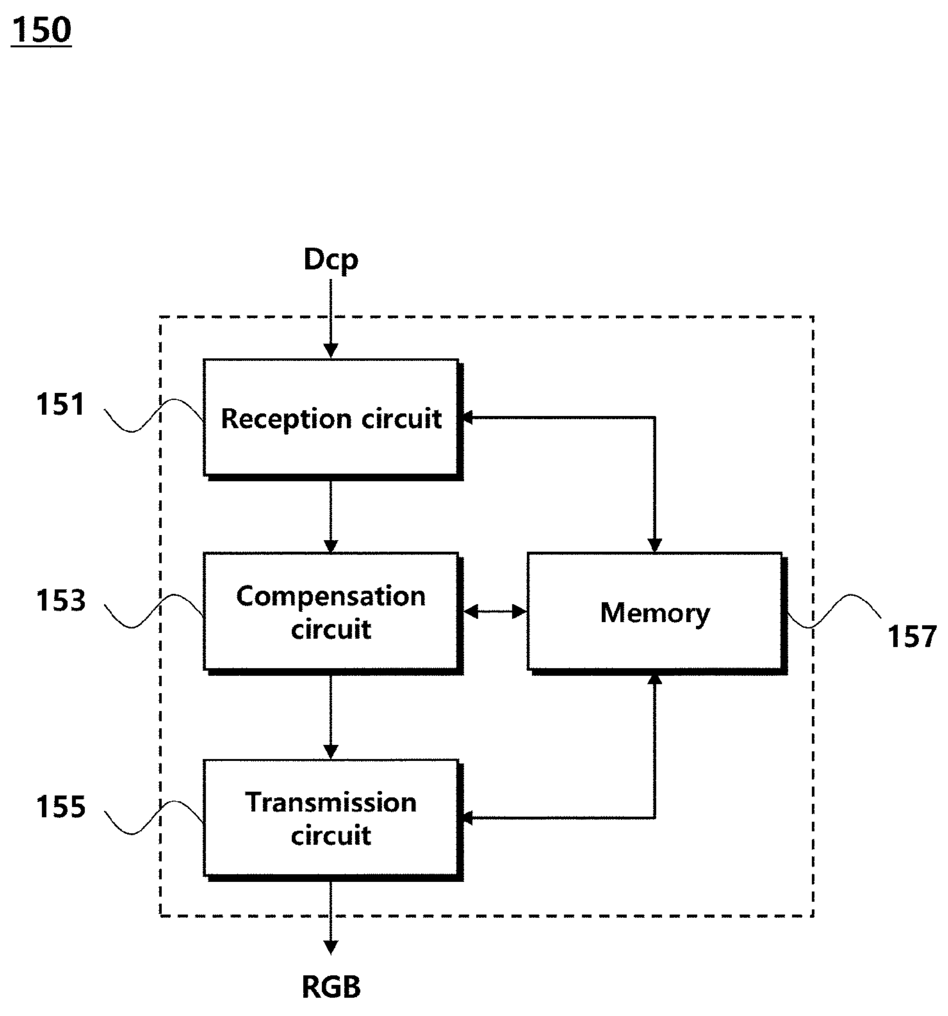
FIG. 5 is a diagram illustrating the configuration of a data processing circuit according to an embodiment.

FIG. 5 is a diagram illustrating the configuration of a data processing circuit according to an embodiment.

Referring to FIG. 5, the data processing circuit 150 may include a reception circuit 151, a compensation circuit 153, a transmission circuit 155, a memory 157, and the like.

The reception circuit 151 may receive image data. The reception circuit 151 may receive the image data via communication with the host 160 or the like.

The compensation circuit 153 may convert the image data. The compensation circuit 153 may convert the image data in order to compensate for deterioration of pixels, and may convert the image data in order to add a predetermined effect to an image. The compensation circuit 153 may convert the image data in units of pixels or in units of blocks in order to compensate for Mura that occurs in a panel.

If a grayscale value included in the image data corresponds to a predetermined grayscale value, the compensation circuit 153 may convert the corresponding grayscale value based on the compensation value. For the other grayscale values which are different from the predetermined grayscale value, the compensation circuit 153 may calculate compensation values according to an interpolation scheme, and may convert the corresponding grayscale values based on the calculated compensation values.

The compensation circuit 153 may recognize the location of a pixel corresponding to a grayscale value included in the image data, may select a block based on the corresponding location, may identify compensation values for the corresponding block from the memory 157, and may perform compensation in association with the grayscale values.

The compensation circuit 153 may use a global gain defined based on a plurality of compensation values corresponding to a plurality of grayscale values for one block, when producing converted image data. In addition, the compensation circuit 153 may convert the image data based on a final compensation value obtained by multiplying a global gain and the representative compensation value of a block.

The compensation circuit 153 may repetitively use one global gain when calculating the final compensation value and, when applying one global gain obtained in one block to the calculation, the storage capacity of the memory 157 may be reduced. In a case when the characteristics of Mura for the respective blocks are determined to be similar, the compensation circuit 153 may repetitively a same global gain to the calculation.

The converted image data may be obtained based on the calibrated grayscale values, and the transmission circuit 155 may transmit the converted image data to the data driving circuit.

Compensation values for converting the image data may be stored in the memory 157. Compensation values for Mura compensation for each block may be stored in the memory 157. The memory 157 may store a compensation value for a predetermined grayscale value which is called "plane" or a set of compensation values for a plurality of grayscale values.

Figure 6:
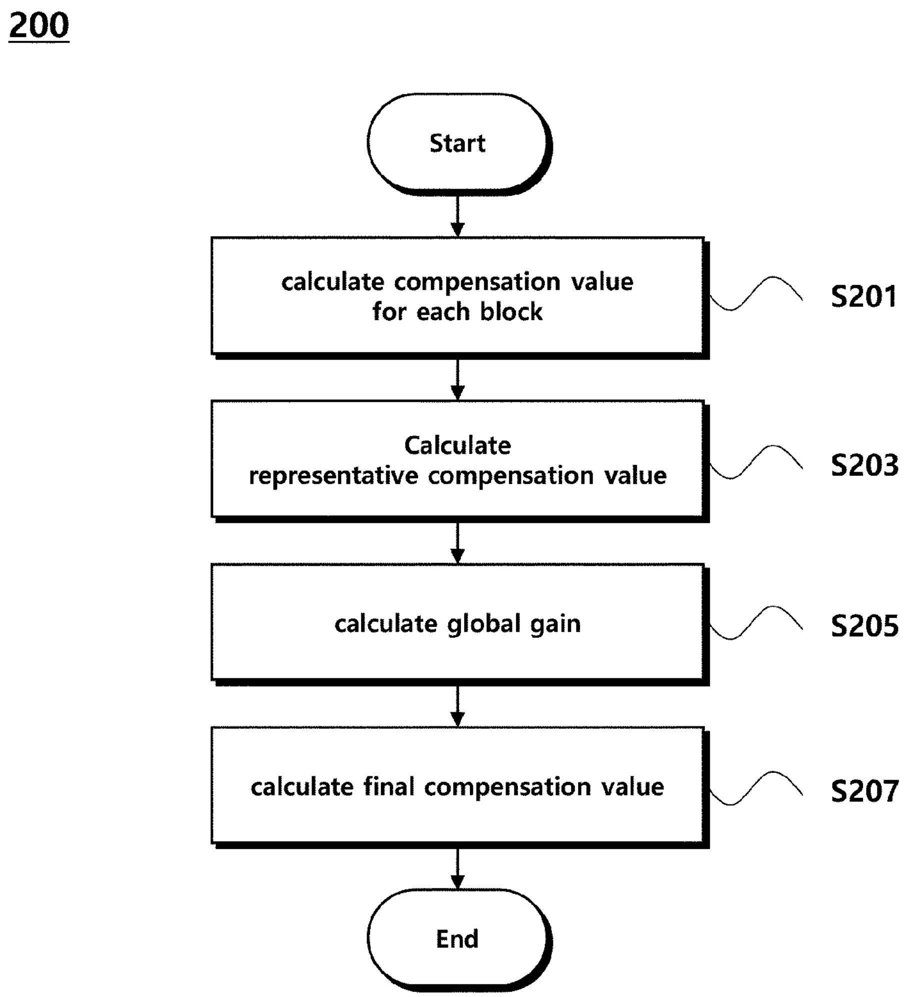
FIG. 6 is a flowchart illustrating a Mura compensation method of a data processing circuit according to an embodiment.

FIG. 6 is a flowchart illustrating a Mura compensation method 200 of a data processing circuit according to an embodiment.

The Mura compensation method 200 of the data processing circuit or a Mura compensation device may include operation S201 of calculating a Mura compensation value for each block, operation S203 of calculating a representative Mura compensation value for each block, operation S205 of calculating a global gain, and operation S207 of calculating a final Mura compensation value.

In operation S201 of calculating a Mura compensation value for each block, a test image for each grayscale is provided to a display panel for Mura compensation, and the shape and the size of Mura may be identified based on the brightness or color of image data obtained by capturing the test image.

In addition, in operation S201 of calculating the Mura compensation value for each block, whether Mura occurs may be determined by determining various Mura factors such as the luminance, the brightness, the color, or the like of the image data for each Mura block including a plurality of pixels.

Here, Mura blocks may be defined as areas, having a same size, obtained by dividing a display panel. As necessary, the size of a block may uniformly increase, for example, by N times (N is a natural number).

In operation S203 of calculating a representative Mura compensation value for each block, an area or a pixel of which a Mura compensation value is to be calculated may be defined for each block. The representative compensation value for each Mura block may be determined based on data of the selected pixel or area.

In a display panel that normally operates, it is normal that image data having the same characteristic, such as an identical brightness, color, or the like, is obtained if a signal of an identical grayscale is supplied.

If Mura occurs, the characteristic of each pixel or area changes and thus, a Mura compensation value for a pixel or a block where Mura occurs may be calculated and compensation may be performed so that the data of a pixel or an area where Mura occurs is calibrated to have the identical characteristic. Depending on the case, Mura compensation may be performed to enable the panel to be in a normal display range.

As a reference value for compensation associated with a pixel, an average pixel brightness value or the brightness values of pixels located in the center of the panel may be used. The magnitude of a Mura compensation value may be calculated to cope with the magnitude of a brightness value which is greater than or less than the reference value.

If a compensation value for every pixel of the display panel is calculated, the capacity of the memory may be insufficient, and thus, whether Mura occurs is determined for each block and a compensation value for Mura may be produced for each block.

In addition, in a case when Mura phenomena in respective blocks have similar characteristics, the compensation values of all the block are not calculated, but, a compensation value in one block is calculated and used so that the calculation speed can be improved and the memory use amount can be reduced.

In operation S205 of calculating a global gain, a global gain which is a reference for compensation associated with a Mura block may be calculated in order to calibrate the representative compensation value of the Mura block based on a compensation reference value of the display panel. For example, the compensation reference value of the panel is defined to be an average pixel brightness value, but this is not limited thereto.

According to an embodiment, an identical global gain may be applied to all blocks, and a final compensation value may be obtained by applying an identical global gain to the representative compensation value of each Mura block.

According to an embodiment, if a global gain is used, a single look-up table (LUT) calculated based on a single block is used and the amount of calculation performed may be reduced, which is advantageous.

Here, the global gain may be a ratio or a difference of compensation values corresponding to brightness values.

In operation S207 of calculating a final Mura compensation value, a final compensation value may be obtained by multiplying the representative compensation value calculated in operation S203 and the global gain calculated in operation S205, and Mura of the Mura block may be removed.

Figure 7:
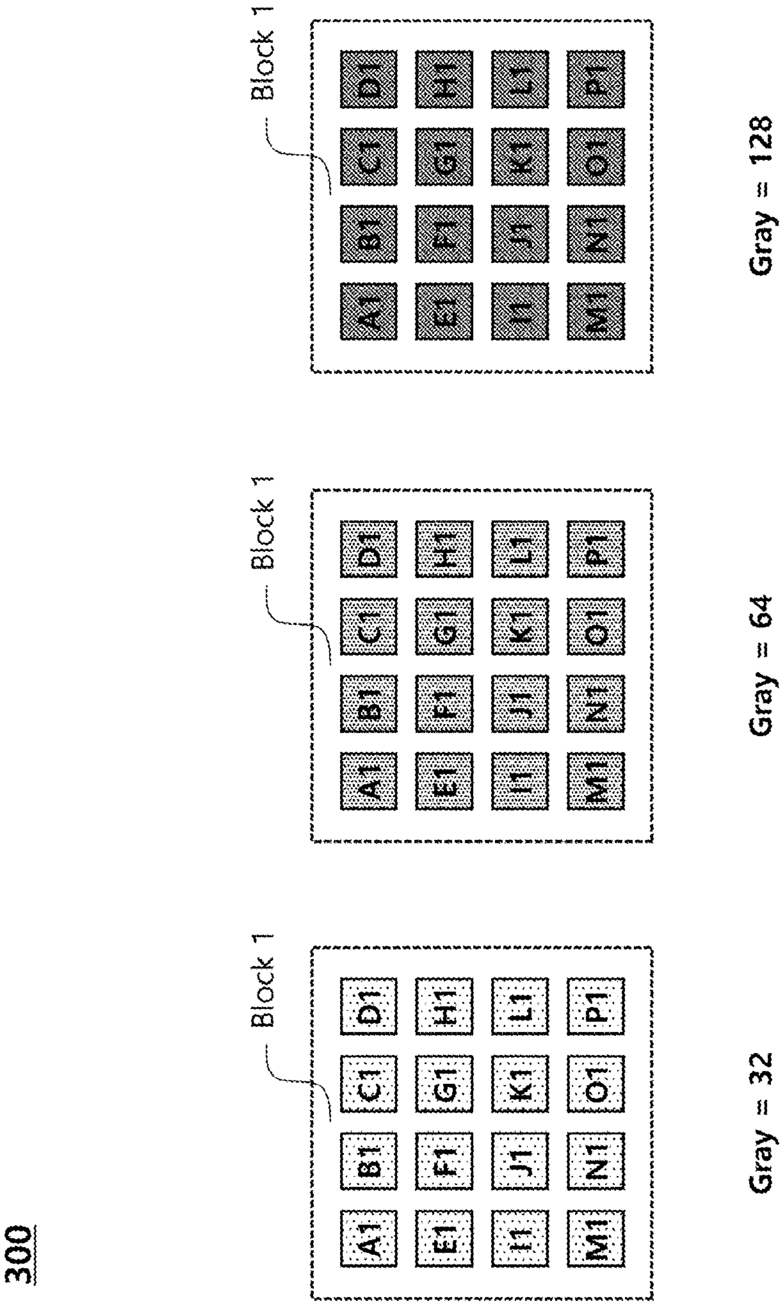
FIG. 7 is a diagram illustrating a change in a panel over a change in a grayscale in one Mura block.

FIG. 7 is a diagram illustrating a change in a panel over a change in a grayscale in one Mura block.

To calculate Mura, compensation values for the entire area of a display panel may be calculated. However, to reduce the number of operations performed and a memory capacity used, a compensation value may be calculated for each divided block.

In this instance, if a grayscale value delivered via the same block is different, a different brightness value or a different compensation value may be produced.

For example, when the grayscale value of each pixel (A1, B1, C1, D1, E1, F1, G1, H1, I1, J1, K1, L1, M1, N1, O1, and P1) in block 1 is 32, 64, and 128 in respective cases, a difference in brightness of the display panel among the cases may be calculated.

Figure 8:
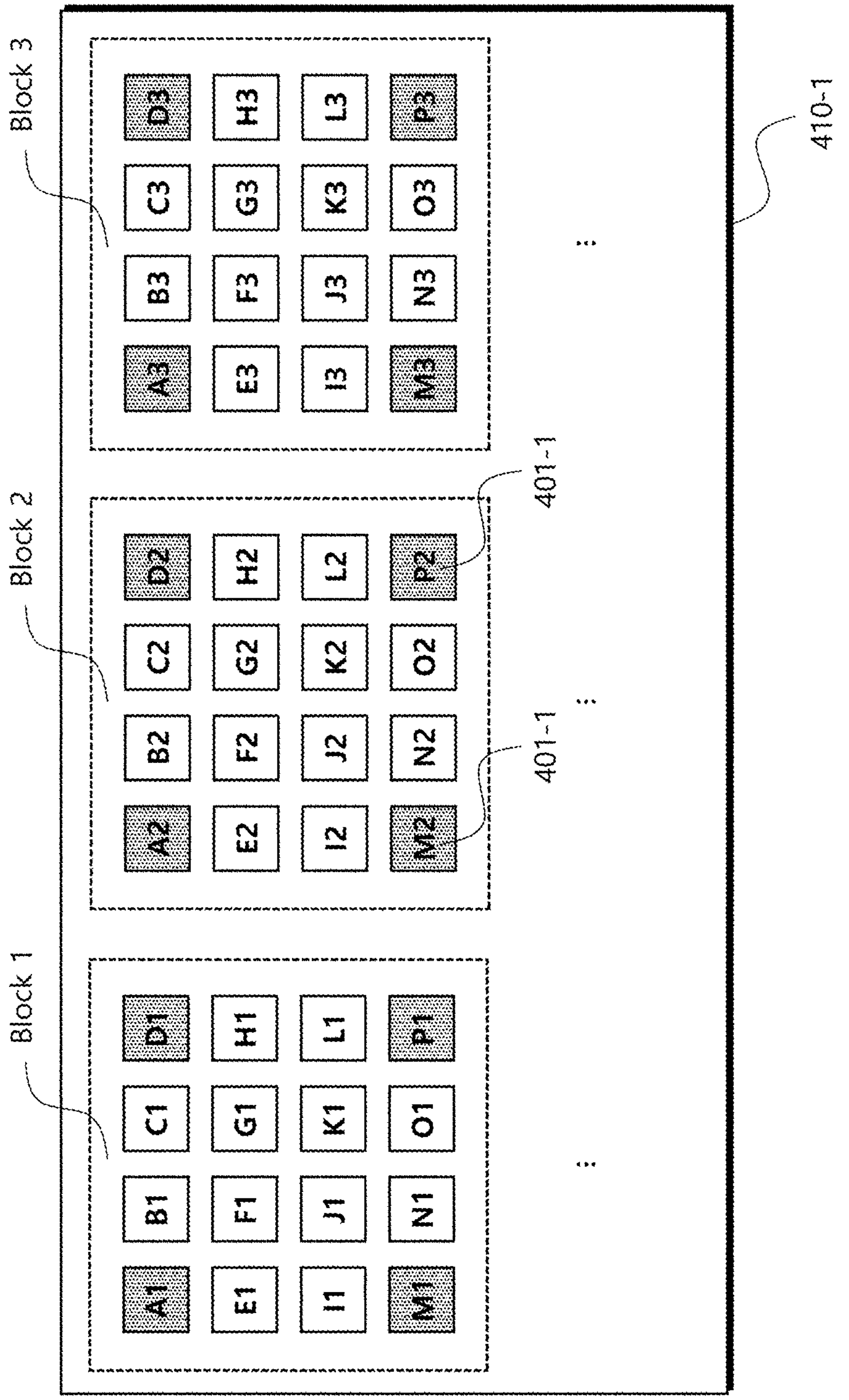
FIG. 8 is a diagram illustrating a first example of a method of calculating a representative value of a Mura block according to an embodiment.

FIG. 8 is a diagram illustrating a first example of a method of calculating a representative value of a Mura block according to an embodiment.

Referring to FIG. 8, a representative value of a Mura block may be calculated by calculating the average of compensation values of a plurality of pixels according to an embodiment.

For example, the entire panel may be divided into blocks, wherein each block has a 4×4 block size and includes 16 pixels. Depending on the case, each block may include N×M pixels (N and M are natural numbers). A block size is in inverse proportion to a memory capacity. Accordingly, if a block size increases, the capacity of a memory used decreases. Depending on the case, a block size used as a reference may be adjusted.

In order to calculate the representative value of a block, some pixels 401-1 of the block in the entire panel 410-1 are selected, and the representative compensation value of the block may be calculated. Depending on the case, the representative compensation value of the block may be calculated by calculating the average of Mura compensation values of the selected some pixels 401-1. In this instance, compensation values which are based on the same grayscale value may be used when the representative compensation value of a block is calculated for each block, but compensation values which are based on different grayscale values may also be used.

For example, for block 1, the representative value of the block may be calculated based on compensation values at a grayscale value of 32. For block 2, the representative value of the block may be calculated based on compensation values at a grayscale value of 64.

Figure 9:
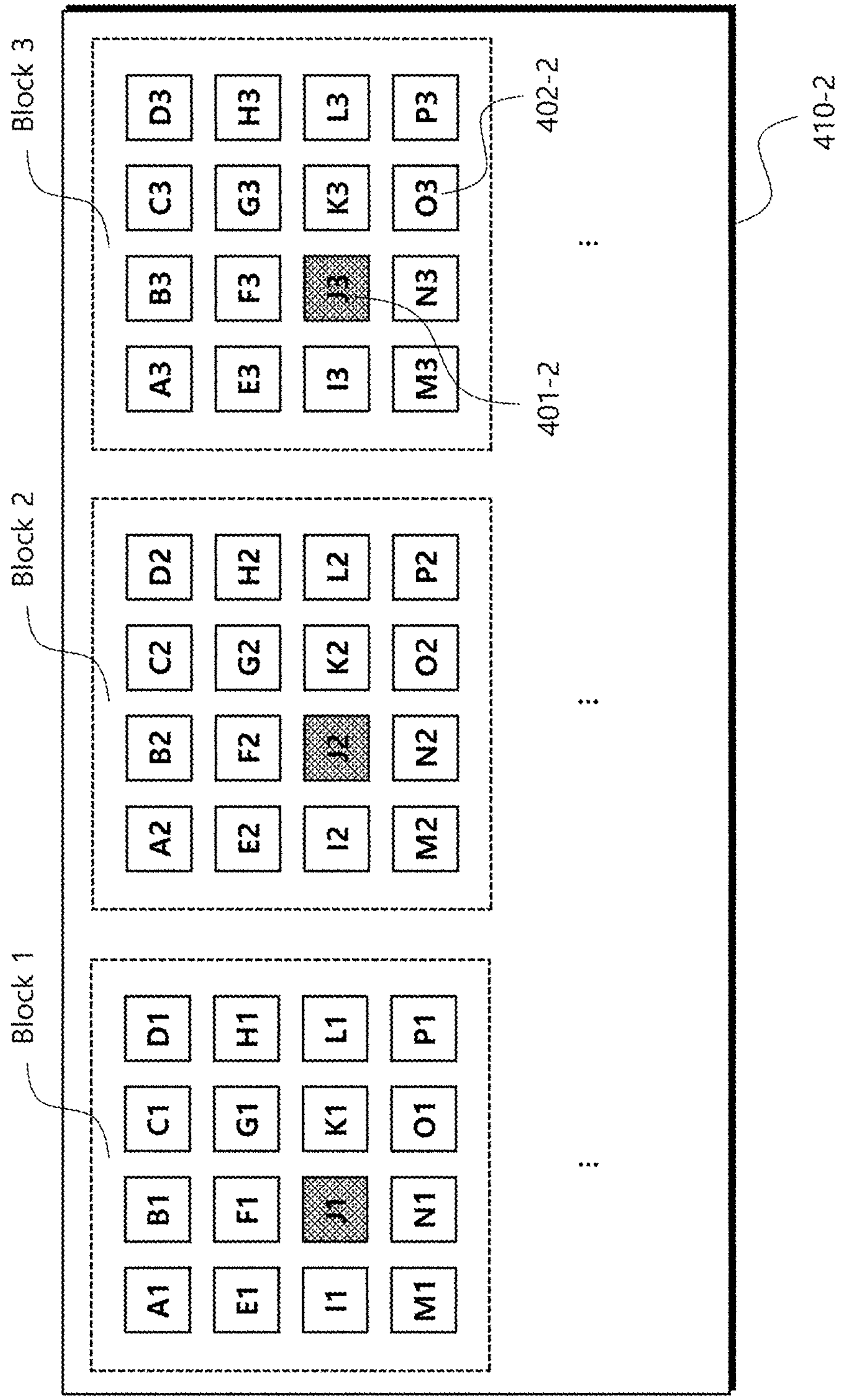
FIG. 9 is a diagram illustrating a second example of a method of calculating a representative value of a Mura block according to an embodiment.

FIG. 9 is a diagram illustrating a second example of a method of calculating a representative value of a Mura block according to an embodiment.

Referring to FIG. 9, the representative value of a Mura block may be calculated based on the compensation value for pixel 401-2 disposed in a predetermined location according to an embodiment.

In this instance, the compensation value for pixel 402-2 which is not selected may not be calculated and thus, the number of operations by a processor and the amount of memory used may be reduced.

For example, a pixel located in J1 may be selected in block 1, and a pixel located in J2 may be selected in block 2. However, the location selected may be defined differently depending on the case.

It is determined that the representative compensation value of a block is one for each block. In this instance, the number of variables used is decreased and thus, a memory capacity required may be reduced. Depending on the case, calculation may be simply performed by defining the compensation values for respective blocks as a single matrix.

The representative Mura compensation values may have a magnitude of 8 bits in the range of −128 to 127. Depending on the case, the compensation values may have a magnitude of 10 bits in the range of −512 to 511, and may have a magnitude of 12 bits in the range of −2048 to 2047. The magnitude of a memory required may be adjusted based on a required accuracy.

Figure 10:
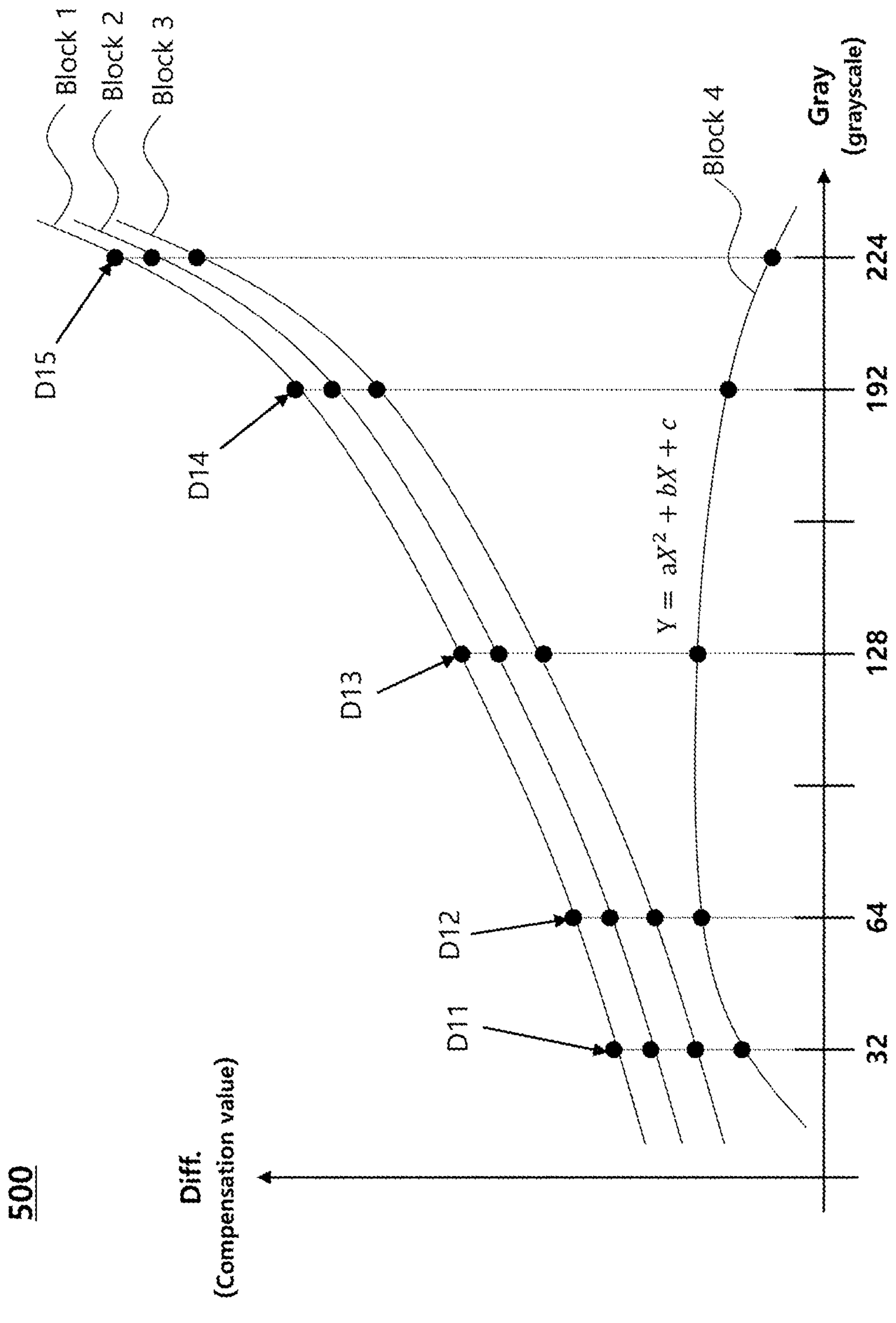
FIG. 10 is a diagram illustrating a conventional Mura compensation method.

FIG. 10 is a diagram illustrating a conventional Mura compensation method.

Referring to FIG. 10, a graph 500 shows the distribution of Mura compensation values for each grayscale value.

In the case of the compensation values for each grayscale, if a grayscale value is set to be in the range of 0 to 255, a change in compensation values of block 1 may be calculated by performing a total of 256 operations in block 1.

If compensation values are calculated for all grayscales, the number of operations performed may be rapidly increased. According to the conventional Mura compensation method such as the publication of Korean patent application No. KR 10-2020-0079920 A, a Mura compensation value may be calculated by performing plotting based on 5 measurement values. According to the conventional method, each coefficient of a quadratic function for each block is stored in a memory and thus, the memory usage may be increased in proportion to the number of coefficients in the quadratic function.

That is, if the quadratic function is used for Mura compensation, a memory size of (horizontal size)×(vertical size)×(number of subpixels)/(4×4-block size)×(24 bits) may be required, in order to store coefficient a of a quadratic term, coefficient b of a linear term, and coefficient c of a constant term.

In addition, if a Mura compensation value is calculated using a quadratic function according to the conventional Mura compensation method, the accuracy of the mura compensation value calculation may be different for each block. For example, in the case of block 4 which has a different characteristic from those of neighboring blocks, the distribution of the Mura compensation values of block 4 may be different from the distributions of compensation values of blocks 1 to 3. The calculative error may act as a factor that decreases the accuracy of Mura compensation. When Mura of the display panel is worse, the accuracy of calculation of a Mura compensation value using a quadratic function may be decreased.

Figure 11:
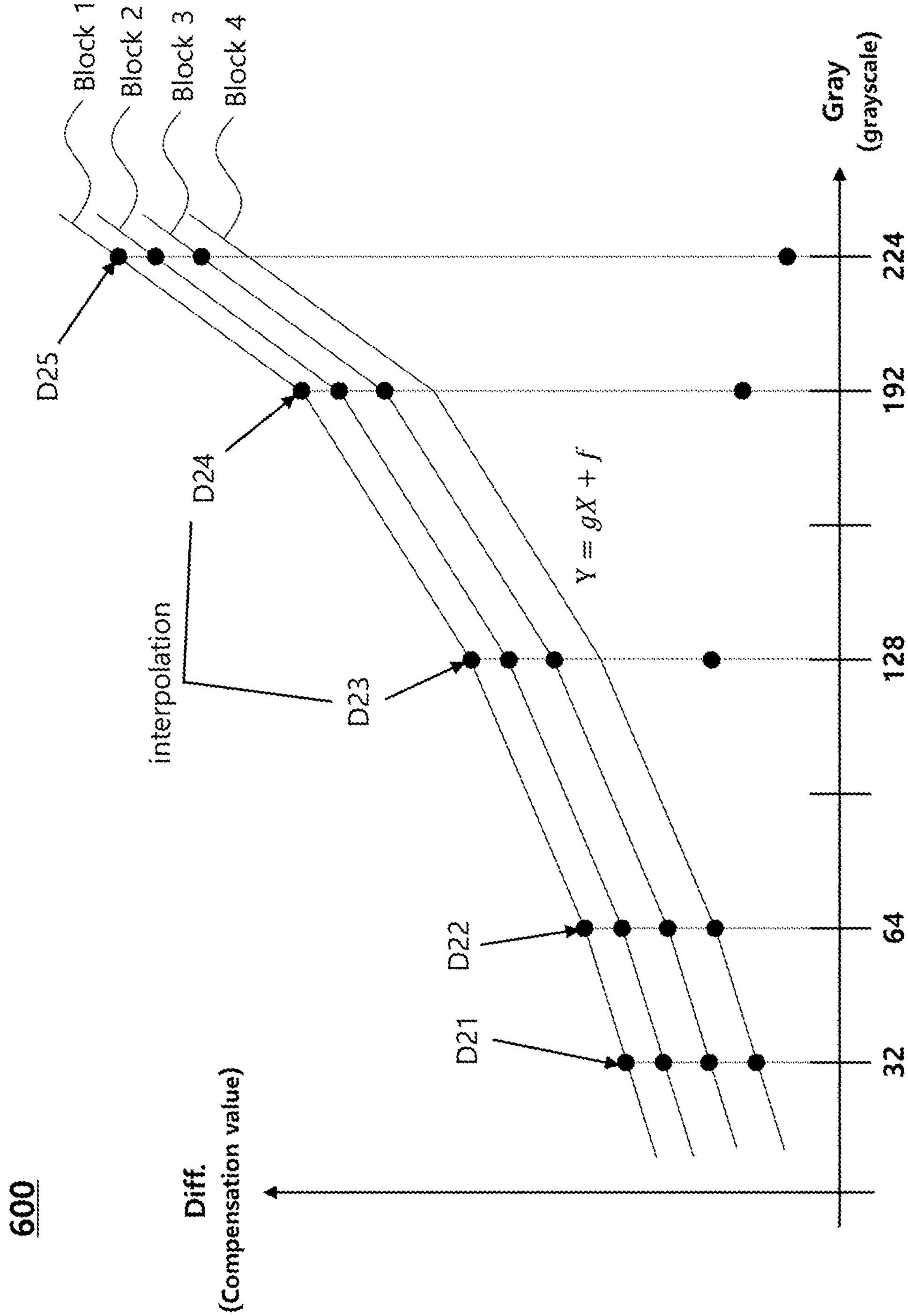
FIG. 11 is a diagram illustrating a Mura compensation method according to an embodiment.

FIG. 11 is a diagram illustrating a Mura compensation method according to an embodiment.

Referring to FIG. 11, a graph 600 shows the distribution of Mura compensation values for each grayscale value.

According to the conventional method, Mura compensation is performed by configuring three to five look-up tables (LUT). However, the data processing circuit 150 according to an embodiment may produce a single look-up table (LUT) to perform Mura compensation.

The data processing circuit 150 according to an embodiment may provide a Mura compensation value calculation method that improves the accuracy of Mura compensation and reduces the amount of memory used, by using a global gain as a global variable.

Here, the global gain may be a group of compensation values or compensation ratios stored in one look-up table.

The Mura compensation device 20 may select a single block and calculate a compensation value for each grayscale of the block, so as to produce a global gain. For example, the global gain may be calculated by selecting block 1. However, the global gain may be obtained based on another block If it is identified that Mura characteristics are similar and Mura intensity in each block is different via recognition of the Mura characteristics of all grayscales, a global gain may be used, and the amount of memory used may be reduced.

If blocks have similar characteristics, a look-up table (LUT) obtained based on a single block may be equally applied to Mura compensation value calculation for each block.

A single Mura compensation value for each grayscale value is calculated in a block different from the block used for obtaining the look-up table (LUT). A global gain may be applied based on the Mura compensation value, and the Mura compensation value required for the all grayscale values may be calculated.

For example, a single look-up table (LUT) may be configured by calculating Mura compensation value D21 at a grayscale value of 32 of block 1, calculating Mura compensation value D22 at a grayscale value of 64 of block 1, calculating Mura compensation value D23 at a grayscale value of 128 of block 1, calculating Mura compensation value D24 at a grayscale value of 192 of block 1, and calculating Mura compensation value D25 at a grayscale value of 224 of block 1. Depending on the case, Mura compensation value D25 at a grayscale value of 224 may be defined as the representative compensation value of block 1, but this is not limited thereto.

Subsequently, if the same operation is repeated in blocks 2 to 4, the number of operations performed may be increased in proportion to the number of blocks. However, if a global gain according to an embodiment is used, only a single look-up table (LUT) is used, the number of operations performed by a data processing device and the amount of memory used may be reduced.

In order to apply a global gain, the ratio of a Mura compensation value may be calculated for each block. For example, if the Mura compensation value at a grayscale value of 32 in block 1 is 10 and the Mura compensation value at a grayscale value of 32 in block 2 is 5, the ratio of a Mura compensation value is defined to be 0.5.

In addition, the Mura compensation method of a data processing device according to an embodiment may calculate Mura compensation values at some representative grayscale values, as opposed to calculating Mura compensation values at all grayscale values, and may perform interpolation thereon so as to reduce the number of operations performed and the amount of memory used. For example, in the case of a change in compensation value over a change in grayscale value, the number of used variables may be reduced through linear interpolation.

According to another embodiment, a look-up table (LUT) may be configured by obtaining a global gain based on a single block according to the above-described plotting method of a quadratic function. In this instance, the plotting method of a quadratic function is not applied to another block, and the obtained global gain is applied and the number of variables used may be reduced.

An error of an interpolation section is insignificant in consideration of the interval of grayscale values and the interval of compensation values, and thus, the obtained Mura compensation values may be available without additional data processing.

If a global gain according to an embodiment is used, an error of block-based operation in association with blocks having similar Mura characteristics, such as the case of block 4, may be reduced. The above-described plotting error of FIG. 8 may be prevented by using a global gain.

If a global gain based on a single look-up table (LUT) according to an embodiment is used, a single plane is required and thus, a memory size of (horizontal size)×(vertical size)×(number of subpixels)/(4×4-block size)×(8 bits) may be required.

Depending on the case, each block includes N×M pixels (N and M are natural numbers), and a required memory size may be 8 bits to 12 bits based on the accuracy of a compensation value. Mura blocks may be defined as at least two areas having a same size obtained by dividing a display panel, but, are not limited thereto.

When compared to a conventional memory size that requires a plurality of planes, a required memory size may be reduced in proportion to the reduction of the number of planes.

A Mura compensation device may define a global gain differently for each sub-pixel, and may define a global gain for sub-pixel R, may define a global gain for sub-pixel GL, may define a global gain for sub-pixel GR, and may define a global gain for sub-pixel B.

A grayscale value required for calculation of a compensation value may be defined as "plane". In this instance, the number of registers of a global gain may be obtained based on (number of planes)×(number of sub-pixels).

For example, in the case of 5 planes and 4 sub-pixels, the number of registers of a global gain may be a total of 5×4=20.

A final Mura compensation value may be obtained by multiplying the representative compensation value for each block calculated in the Mura compensation device 20 and the global gain.

The Mura compensation device 20 may obtain the representative compensation value for each block at the same grayscale value, and may obtain the representative compensation value for each block at a different grayscale value. A single value obtained according to the above-mentioned representative compensation value calculation method may be stored in the memory 157.

Depending on the case, the Mura compensation device 20 may perform an operation of comparing Mura compensation values obtained at different grayscale values.

The Mura compensation device according to an embodiment may store only a single representative compensation value for each block, and may reduce the amount of memory 157 used. Also, the Mura compensation device may produce a single look-up table (LUT) as a single global gain, and may reduce the amount of memory 157 used. Here, one look-up table means one plane and may physically or logically be divided into multiple sections.

The above-mentioned circuits may be included in the Mura compensation device 20, or may be separately included in the display device 100 or the data processing circuit 150.

Figure 12:
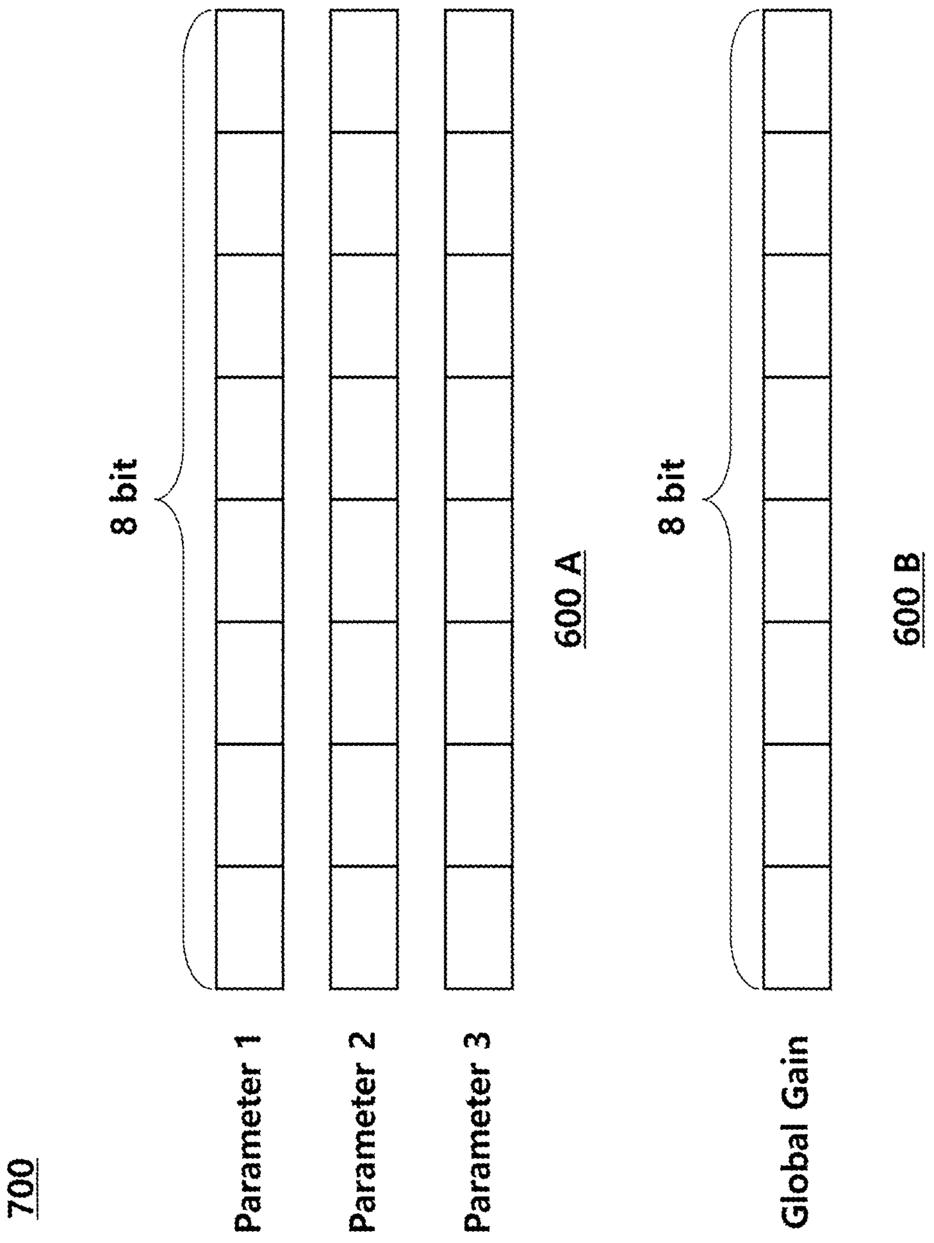
FIG. 12 is a diagram illustrating a change in a memory according to a global gain according to an embodiment.

FIG. 12 is a diagram illustrating a change in a memory according to a global gain according to an embodiment.

Referring to FIG. 12, there is a comparison between a memory usage capacity 700A according to the conventional Mura compensation method and a memory usage capacity 700B according to a Mura compensation method according to an embodiment.

According to the conventional Mura compensation method disclosed in the publication of Korea Patent Application No. 10-2020-0079920 A, all coefficients of a quadratic function need to be stored. For example, if a quadratic function is used for Mura compensation, a memory capacity may consume a memory of 8 bits for each parameter in order to store coefficient a of a quadratic term, coefficient b of a linear term, and coefficient c of a constant term, and the entire memory 700A may consume 24 bits.

Unlike the above, a memory capacity required to perform operation using a single look-up table (LUT) according to an embodiment may be 8 bits, which is ⅓ of the memory capacity required by the conventional method. Accordingly, the memory is more efficiently used. For example, a memory capacity of 8 bits may be consumed to store a global gain calculated based on a single block, and a single brightness value corresponding to a single grayscale value is required from another block, and thus, an additional memory capacity may not be required.

The terms 'compensation value' and 'brightness compensation value' used in the specification may differently be defined depending on methods of measurement of panels and may mean a compensation value for a Mura compensation.

The term 'block' used in the specification may be defined as a group of at least one pixel and its shape or size are not limited. As necessary, a block may be defined as an area or a group of pixels.

The term 'look-up table' used in the specification may be a group of data and may be defined in various ways. For example, the number of look-up tables may be determined according to the size of a look-up table of a group of data. One look-up table may mean one plane and may physically and logically be divided into multiple sections.

What is claimed is:

1. A data processing circuit, comprising:

a reception circuit configured to receive image data comprising grayscale values associated with pixels disposed in a display panel;

a memory configured to store a representative compensation value associated with a grayscale value of each area of the display panel;

a compensation circuit configured to calculate a final compensation value for each area of the display panel by multiplying the representative compensation value of each area and a global gain, and to produce converted image data; and a transmission circuit configured to transmit the converted image data to a data driving circuit.

2. The data processing circuit of claim 1, wherein the representative compensation value is a compensation value for a specific pixel in an area of the display panel or an average of compensation values for a plurality of pixels.

3. The data processing circuit of claim 1, wherein the global gain is defined based on a plurality of compensation values corresponding to a plurality of grayscale values associated with one area of the display panel.

4. The data processing circuit of claim 2, wherein the global gain is obtained via a single look-up table and by performing linear interpolation on compensation values for predetermined grayscale values.

5. The data processing circuit of claim 1, wherein the memory is configured to store the final compensation values calculated by the compensation circuit and the global gain.

6. The data processing circuit of claim 1, wherein the compensation circuit is configured to select an area based on a location of each pixel, determine whether Mura occurs for the selected area, and produce the converted image data.

7. The data processing circuit of claim 1, wherein the compensation circuit is configured to repetitively use a same global gain for the final compensation values for respective areas.

8. The data processing circuit of claim 1, wherein the representative compensation value for the grayscale value of each area is calculated based on differences between brightness values of pixels in the area and a target brightness value.

9. A Mura compensation device, comprising:

a reception circuit configured to obtain a plurality of brightness values corresponding to a plurality of grayscale values associated with a single area of a display panel; and a calculation circuit configured to: calculate compensation values for the plurality of grayscale values so as to resolve a Mura phenomenon caused by differences between target brightness values and the plurality of brightness values, calculate a global gain based on the plurality of brightness values corresponding to the plurality of grayscale values associated with the single area, and calculate final compensation values by producing a representative compensation value for each area and applying the global gain to the representative compensation value for each area.

10. The Mura compensation device of claim 9, wherein the reception circuit is configured to obtain brightness values of one or more pixels in an area, in order to calculate a representative compensation value defined for each area.

11. The Mura compensation device of claim 9, wherein the calculation circuit is configured to calculate the final compensation values by multiplying the representative compensation value for each area and the global gain.

12. The Mura compensation device of claim 9, wherein the calculation circuit is configured to produce an interpolation function based on the plurality of brightness values corresponding to the plurality of grayscale values.

13. The Mura compensation device of claim 12, wherein the interpolation function comprises a linear function, and the calculation circuit is configured to obtain the global gain using the interpolation function.

14. The Mura compensation device of claim 9, wherein the calculation circuit is configured to store a ratio of the compensation values corresponding to the brightness values in one look-up table (LUT) and use the ratio for obtaining the final compensation values.

15. A Mura compensation method, comprising:

calculating brightness compensation values for a plurality of pixels in a Mura area in image data;

calculating a representative compensation value for each Mura area using the brightness compensation values for the plurality of pixels;

calculating a global gain for predetermined grayscales based on a single Mura area; and obtaining a final Mura compensation value by multiplying the representative compensation value for each Mura area and the global gain.

16. The method of claim 15, wherein the image data is obtained by displaying a reference image having an identical grayscale in a display panel and capturing the reference image.

17. The method of claim 15, wherein the representative compensation value of each Mura area is obtained using brightness data which is stored for each area in a memory.

18. The method of claim 15, wherein the global gain for predetermined grayscale values is obtained via a single look-up table.

19. The method of claim 15, wherein Mura areas are at least two areas having a same size obtained by dividing the display panel and each of the brightness compensation values is a brightness compensation value for each grayscale value in a Mura area.

* * * * *